Oct. 20, 1925.
E. B. KAYLOR
1,557,937
CONTROL MECHANISM FOR HEADLIGHTS
Filed Sept. 10, 1923    2 Sheets-Sheet 1
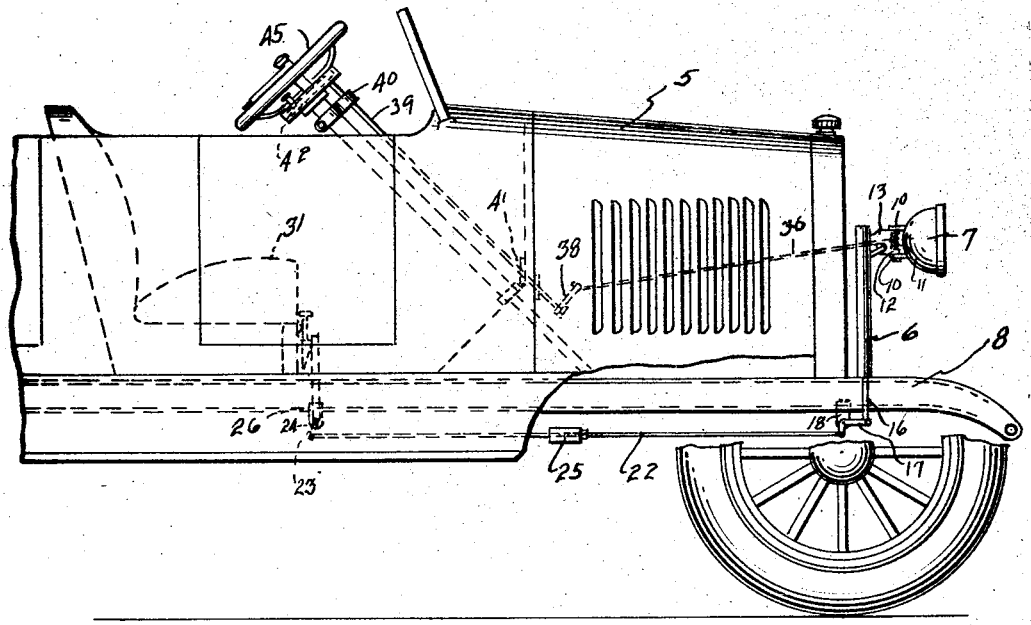
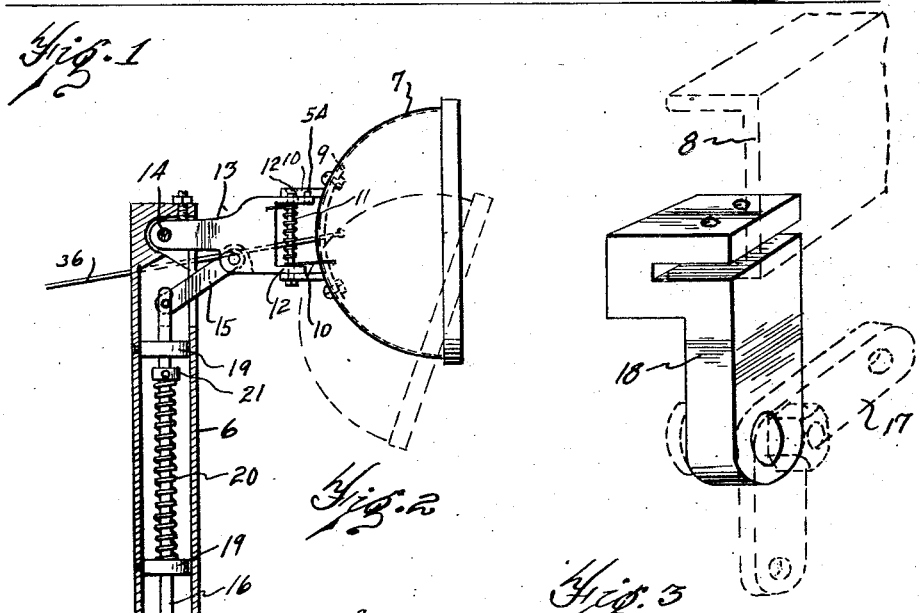
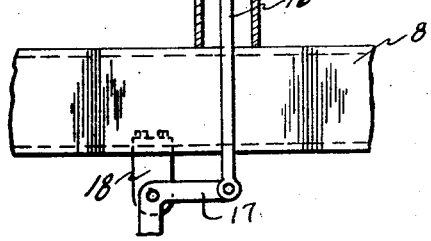
INVENTOR.
BY Edward B. Kaylor
Rex Frye.
ATTORNEY.

Oct. 20, 1925.  1,557,937
E. B. KAYLOR
CONTROL MECHANISM FOR HEADLIGHTS
Filed Sept. 10, 1923  2 Sheets-Sheet 2

INVENTOR.
Edward B. Kaylor
BY Rex Frye
ATTORNEY.

Patented Oct. 20, 1925.

1,557,937

UNITED STATES PATENT OFFICE.

EDWARD B. KAYLOR, OF DETROIT, MICHIGAN.

CONTROL MECHANISM FOR HEADLIGHTS.

Application filed September 10, 1923. Serial No. 661,737.

*To all whom it may concern:*

Be it known that I, EDWARD B. KAYLOR, a citizen of the United States, and resident of Detroit, in the county of Wayne and State of Michigan, have invented new and useful Improvements in Control Mechanism for Headlights, of which the following is a specification.

This invention relates to control mechanism for headlights of automobiles, motor boats and like vehicles, and has for its principal object the provision of mechanism for automatically swinging in a horizontal plane one only of the headlights while the vehicle is being turned and for manually swinging both headlights simultaneously in a vertical plane to vary the distance of the projection of the light rays therefrom.

Another object of the invention is the arrangement of the control mechanism whereby when the vehicle is turned in either direction the light adjacent the outer wheel is turned to direct its light rays in the direction about to be assumed by the vehicle while the lamp adjacent the inner wheel remains stationary to project its rays in the direction which the vehicle was formerly traveling.

A further object of the invention is the mounting of the control mechanism with a clutch member adjacent the steering wheel of the vehicle whereby the automatic headlight swinging mechanism can be connected or disconnected from the steering mechanism at will.

The above and other objects of this invention will be apparent from the following description, wherein reference is made to the accompanying drawings illustrating a preferred embodiment of the invention, and wherein similar reference numerals designate corresponding parts throughout the several views.

In the drawings:

Fig. 1 is a side elevation of an automobile equipped with my improved control mechanism, parts being broken away.

Fig. 2 is an enlarged detail section through one of the hollow posts on which the headlights are mounted.

Fig. 3 is a detail perspective view of one of the fulcrum brackets for the lifting and lowering mechanism.

Figure 4:
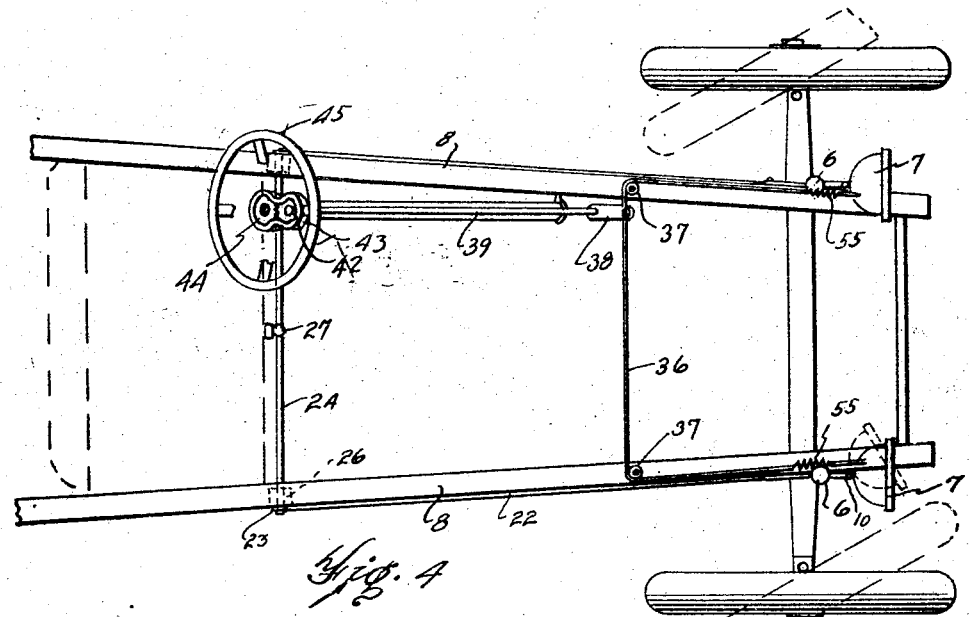
Fig. 4 is a diagrammatic plan view showing the mounting of the control mechanism upon the vehicle chassis.
Figure 5:
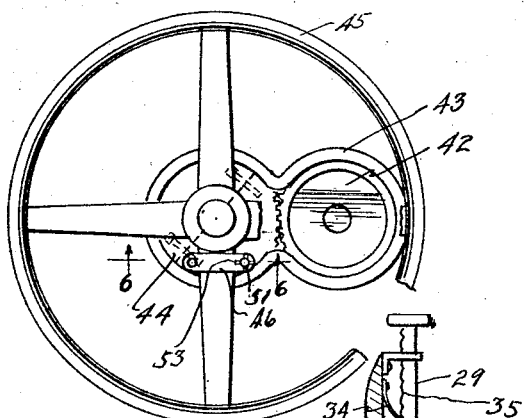
Fig. 5 is a plan view of the steering wheel and associated control mechanism.

Referring now to the drawings, the numeral 5 designates an automobile body of any desired construction to which is bolted or otherwise suitably secured hollow standards 6 for supporting a headlight 7. A standard 6 serves to support each headlight and is hereby shown as mounted upon the longitudinal rails 8 of the chassis or frame of the automobile immediately in advance of the radiator of the car. It will be understood that the position of the standard 6 is optional, and may be changed to accord with the body design of each car. The headlight 7 is bolted or otherwise suitably united to a bracket 9 having upper and lower spaced arms 10 apertured adjacent their free extremities for the reception of a pivot bolt 11 extending vertically through the arms 10 of the bracket 9 and also through forwardly projecting arms 12 on the lifting and lowering bracket 13, which is pivotally mounted adjacent its rear extremity upon a bolt 14 mounted adjacent the top of the standard 6 (see Fig. 2). The bracket 9 is utilized for swinging the headlight 7 in a horizontal plane and is mounted directly upon the bracket 13 which is utilized for swinging the headlight 7 in a vertical plane, so that it will be apparent that the headlight is adapted to be swung to project its light rays in the direction about to be assumed by the vehicle regardless of the position of the bracket 13 controlling the vertical movements of the headlight. Thus it will be possible for the driver to manually position his headlights so as to project their light rays either a long distance in front of the car or immediately in advance of the car and at the same time permit the automatic control mechanism to swing either of the headlights to illuminate the road whereon the vehicle is about to be driven.

Figure 7:
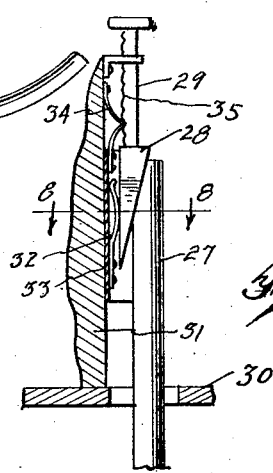
Fig. 7 is an enlarged detail view showing the mounting of the hand lever and associated parts for manually operating the lifting and lowering mechanism.
Figure 8:
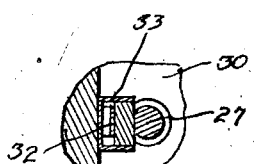
Fig. 8 is a detail sectional view taken substantially on the line 8—8 of Fig. 7.

The mechanism for lifting or lowering the headlight 7 comprises a link 15 pivoted at its extremities to the lower portion of the bracket 13 and the upper extremity of the vertical rod 16 mounted within the standard 6 and connecting at its lower extremity with the bell-crank lever 17 pivoted upon a bracket 18 clamped upon the chassis frame. The rod 16 is mounted for vertical movement in spaced apertured bearings 19 fastened within the hollow standard 6, and is normally maintained in its uppermost position by means of a coil spring 20 encircling the rod 16 and abutting at its extremities against one of the bearings 19 and a collar 21 fixed upon the rod, as clearly shown in Fig. 2. The opposite arm of the bell-crank lever 17 is pivotally connected to the forward extremity of rearwardly extending link 22, the opposite end of which is pivoted to a crank arm 23 secured at the extremity of the shaft 24, substantially as shown in Figs. 1 and 4. A turnbuckle 25 or other desired means may be used for adjusting the length of the link 22 to vehicles of different dimensions and also permits the positioning of the headlights to move simultaneously at all times. The shaft 24 is pivoted within brackets 26 on the chassis frame and carries crank arms 23 at its opposite extremities for connection with the links 22 leading to the respective headlights 7 whereby both headlights are tilted simultaneously through the same arc whenever the shaft 24 is oscillated. Intermediate its ends the shaft 24 carries an upwardly extending operating lever 27 adapted to co-operate with the wedge shaped shoe 28 of the hand lever 29 to swing the shaft 24 whenever it is desired to tilt the headlights 7. As best shown in Figs. 1 and 7 the operating lever 27 extends through an opening in the floor board 30 of the car close to the front of the seat 31 and is formed with a slanting rear surface adapted to rest against the slanting forward surface of the wedge member 28. The wedge member 28 is pressed forwardly into firm engagement with the operating lever 27 by means of a leaf spring 32 secured within the channel guide member 33 (see Fig. 8) and is adapted for vertical movement within the guide 33 whenever hand lever 29 is raised or lowered by the driver. Any desired position of the hand lever 29 can be maintained as long as desired, a projecting ratchet member 34 engaging in any of the series of notches 35 on the rear face of the hand lever 29 to retain the hand lever in adjusted positions.

The operation of the headlight tilting mechanism is believed to be apparent. Whenever it is desired to move the headlights 7 from the normal position shown in full lines in Fig. 2 the hand lever 29 is depressed swinging the operating lever 27 and oscillating the shaft 24 to move the links 22 rearwardly. The rearward motion of the links 22 is transmitted through the bell-crank lever 17 to lower the rod 16 and links 15, whereby the bracket 13 is swung downwardly on its pivot bolt 14 to swing the headlight 7 into a different angular position, substantially as shown in dotted lines in Fig. 2. Whenever it is desired to return the headlights to normal position the hand lever 29 is again raised, freeing the operating lever 27 and permitting the springs 20 surrounding the rod 16 to force the rod 16 and links 15 upwardly to return the headlight 7 to the full line position shown in Fig. 2, the upward movement of the rod 16 pulling the links 22 forwardly to maintain the operating lever 27 in firm engagement with the wedge member 28 of the hand lever 29.

Figure 6:
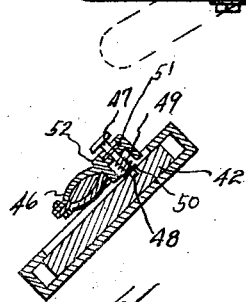
Fig. 6 is a detail sectional view taken substantially on the line 6—6 of Fig. 5.

The mechanism for automatically turning either of the headlights 7 in a horizontal plane whenever desired, comprises a flexible cord or cable 36 secured at its extremities to the inner portions of the headlight 7 at points sufficiently out of line with the pivot bolts 11 to provide a power arm for swinging the headlights whenever a pull is exerted upon one of the extremities of the cable 36 (note Fig. 1). The cable 36 preferably passes in a substantially rearward direction from adjacent each of the lamps 7 to pulleys 37 mounted upon the vehicle chassis or foot board of the automobile and extend across the car from pulley to pulley, being connected intermediate the pulleys with a crank arm 38 fixed on the lower extremity of the shaft 39, preferably arranged in substantial parallelism with the steering column of the automobile and mounted in upper and lower bearings 40 and 41 on the steering column and dashboard respectively. The upper extremity of the shaft 39 carries a pinion 42 housed in a divided casing 43 adapted to prevent accidental dislocation of the pinion 42 and the gear 44 with which it is in mesh. The gear 44 is preferably formed in two or more sections for convenient assembly around the steering column and is adapted to lie within the casing 43 with its pivotal axis concentric with that of the steering column so that the gear 44 may be rotated simultaneously with the steering wheel 45 whenever the gear 44 is connected with the steering wheel. In the illustrated embodiment I have provided a simple form of clutch mechanism between the gear 44 and the steering wheel comprising a bracket 46 clamped upon one of the arms of the steering wheel and carrying an apertured sleeve for the reception of a movable pin 47 (see Fig. 6) adapted to fit into one or more apertures 48 in the upper face of the gear 44 whenever the pin 47 is in its lowermost position. A spring 49 is provided for holding the pin 47 in its lowered position as long as desired, the spring 49 being herein illustrated as abutting against a cross pin 50 on the pin 47 and the bracket 46. The pin 47 can be manually lifted out of engagement with the apertures 48 in the gear 44 by merely pulling the pin upwardly against the tension of the spring 49, and may be maintained in this raised position by turning the pin 47 so that the cross bar 51 thereon rests against the raised outer wall 52 of the bracket 46, which wall is sufficiently spaced above the apertured portion of the bracket to hold the lower end of the pin 47 out of engagement with the gear 44. Suitable notches 53 may be provided in this outer wall 52 to permit the falling of the pin 47 whenever the cross bar 51 is turned to enter the notches 53. It will be apparent, therefore, that the pin 47 can be adjusted to connect the steering wheel with the gear 44 by simply turning the pin 47 to permit the cross bar 51 to enter the notches 53 in the wall 52, the spring 49 lowering the pin 47 into one of the apertures 48 in the gear 44. As long as the pin 47 remains in its lowered position the gear 44 will be turned simultaneously with the steering wheel whenever it is desired to swing the vehicle out of its course, as upon turning a corner. The steering wheel and gear 44 can be readily disconnected by merely lifting the pin 47 out of the aperture 48 in the gear and turning the pin so that its cross bar 51 engages the high portions of the wall 52. This disconnected position can be maintained during daylight hours, or whenever it is not desired to automatically swing the headlights during turning movements of the vehicle.

In operation, whenever it is desired to automatically swing the headlights upon turning corners the pin 47 is lowered to connect the steering wheel of the vehicle with the gear 44 of the control mechanism whereupon the rotation of the steering wheel will turn the gear 44 and the pinion 41 to oscillate the shaft 49 and crank arm 38, which as above described is connected with the cable 36 intermediate the ends of the cable. Whenever the crank arm 38 is moved in one direction, as for example whenever a turn to the right is being made, the end of the cable connected with the lamp on the left side of the vehicle will be pulled to swing the lamp on its pivot pin 11, the opposite end of the cable 36 being slackened, and so not affecting the normal position of the lamp 7 on the right side of the vehicle. As best shown in Fig. 2 I have provided a coil spring 10$^a$ around the pivot pin 11 with its ends respectively contacting the bracket 13 and one of the arms 10 of the bracket 9 whereby spring pressure is exerted to normally maintain the lamps 7 in position to cast their rays directly in front of the car, a stop 54 being provided to be abutted by the arm 10 of the bracket 9 and preventing further motion of the lamp toward the outside of the car. When the wheels of the vehicle again straighten, the return movement of the steering wheel swings the crank arm 38 to its normal position, as shown in Fig. 4, whereupon the spring 10$^a$ on the left hand lamp returns the headlight to normal position as the adjacent end of the cable 36 is slackened. Whenever a turn to the left is made the crank arm 38 is turned in the opposite direction and a pull is exerted on the cable 36 to swing the lamp on the right hand side of the vehicle inwardly, while the end of the cable adjacent to the left hand lamp is slackened. Accordingly the lamp adjacent the outer wheel of the vehicle during any turning movement is automatically swung to illuminate the road about to be entered by the vehicle without affecting the normal position of the opposite lamp. Stiff coil springs 55 may be provided intermediate the ends of the cable 36 to prevent the transmission of shock to the headlights whenever a sudden movement is transmitted from the steering wheel, and also to stretch and so absorb pulls on the cable beyond what is needed to swing the headlights through their maximum arc.

By clamping the fulcrum brackets 18 to the chassis frame members, as best illustrated in Fig. 3, I am enabled to mount my control mechanism upon cars without weakening the chassis frame, and permit the quick attachment of my control mechanism by the use of tools ordinarily carried in the repair kit of every automobile.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, I claim

1. Control mechanism for headlights comprising a pair of headlight supporting standards mounted on a vehicle, a bracket pivotally mounted in each standard and movable in a vertical plane, a second bracket pivotally mounted upon the first mentioned bracket and adapted to swing thereupon, a headlight secured to said last mentioned bracket, manually operated means connected with the first mentioned bracket for lifting and lowering the headlight, and means actuated from the steering mechanism of the vehicle for swinging the headlight relatively to the first mentioned bracket.

2. Control mechanism for headlights comprising a pair of headlight supporting standards mounted on a vehicle, a bracket pivotally mounted in each standard and movable in a vertical plane, a second bracket pivotally mounted upon the first mentioned bracket and adapted to swing thereupon, a headlight secured to said last mentioned bracket, manually operated means connected with the first mentioned bracket for lifting and lowering the headlight, and means actuated from the steering shaft of the vehicle for swinging the headlight relatively to the first mentioned bracket, including a cable connected at its ends to the headlights and a member oscillating on an axis parallel with the steering shaft connected to the cable intermediate its ends.

3. Control mechanism for headlights comprising a pair of headlight supporting standards mounted on a vehicle, a bracket pivotally mounted in each standard and movable in a vertical plane, a second bracket pivotally mounted upon the first mentioned bracket and adapted to swing thereupon, a headlight secured to said last mentioned bracket, manually operated means connected with the first mentioned bracket for lifting and lowering the headlight, and means actuated from the steering shaft of the vehicle for swinging the headlight relatively to the first mentioned bracket, including a cable connected at its ends to the headlights and a rod pivoted on an axis parallel with and movable simultaneously with the steering shaft of the vehicle and carrying a radial arm connected with the cable intermediate its ends.

4. Control mechanism for headlights comprising a pair of headlight supporting standards mounted on a vehicle, a bracket pivotally mounted in each standard and movable in a vertical plane, a second bracket pivotally mounted upon the first mentioned bracket and adapted to swing thereupon, a headlight secured to said last mentioned bracket, manually operated means connected with the first mentioned bracket for lifting and lowering the headlight, and means actuated from the steering mechanism of the vehicle for swinging the headlight relatively to the first mentioned bracket, including a cable connected at its ends to the headlights, a shaft carrying an arm adjacent its lower extremity connected with the cable intermediate its ends and carrying at its upper extremity a pinion, a gear mounted concentrically with the steering wheel of the vehicle and meshing with the pinion, and means for connecting the gear with the steering wheel at will.

5. Control mechanism for vehicle headlights comprising a pair of headlights mounted on a vehicle, a flexible cable connected at its ends to the respective lights, a member connected to the cable intermediate its ends, a pinion carried by said member, a gear journaled on the steering shaft of the vehicle meshing with the pinion, and means carried by the steering mechanism for connecting or disconnecting the gear with the steering mechanism of the vehicle at will.

6. Control mechanism for headlights comprising a pair of headlights mounted on a vehicle, a flexible cable connected at its ends to the respective lights, a member connected to the cable intermediate its ends, a pinion carried by said member, a gear meshing with the pinion, and means for connecting or disconnecting the gear with the steering mechanism of the vehicle at will, including a clutch member carried by the steering mechanism of the vehicle and movable into and out of engagement with said gear.

7. Control mechanism for headlights comprising a pair of headlights mounted on a vehicle, a flexible cable connected at its ends to the respective lights, a member connected to the cable intermediate its ends, a pinion carried by said member, a gear meshing with the pinion, and means for connecting or disconnecting the gear with the steering mechanism of the vehicle at will, including a pin liftable into and out of engagement with said gear, and means carried by the steering mechanism of the vehicle for holding the pin in its raised or lowered position.

8. The combination with a vehicle having a pair of headlights and steering mechanism, a flexible cable connected at its extremities to the respective headlights and extending directly rearwardly from each light, a pair of pulleys mounted on the vehicle in substantial alignment with the lights to guide the cable, springs arranged intermediate the ends of the cable to absorb excessive pulls thereon, means for moving said cable in either direction connected with the cable between the pulleys, means carried by the steering mechanism for moving said member from the steering mechanism of the vehicle, and means for disconnecting said last mentioned means at will.

In witness whereof I hereunto set my hand.

EDWARD B. KAYLOR.